United States Patent [19]
Holcombe et al.

[11] Patent Number: 5,443,892
[45] Date of Patent: Aug. 22, 1995

[54] COATED GRAPHITE ARTICLES USEFUL IN METALLURGICAL PROCESSES AND METHOD FOR MAKING SAME

[75] Inventors: Cressie E. Holcombe; Eugene L. Bird, both of Knoxville, Tenn.

[73] Assignee: Martin Marietta Energy Systems, Inc., Oak Ridge, Tenn.

[21] Appl. No.: 34,439

[22] Filed: Mar. 19, 1993

[51] Int. Cl.6 .............................................. C04B 41/06
[52] U.S. Cl. .................... 428/216; 428/212; 428/469; 428/472; 428/408; 428/697; 428/699; 428/701; 428/702
[58] Field of Search ............... 428/212, 472, 469, 408, 428/697, 699, 701, 702, 216

[56] References Cited

U.S. PATENT DOCUMENTS 3,771,976 11/1973 Wakefield ........................... 428/408
3,900,592 8/1975 Kennedy et al. ................... 428/212

FOREIGN PATENT DOCUMENTS 56-17914 2/1981 Japan.
59-39784 3/1984 Japan.

Primary Examiner—Archene Turner
Attorney, Agent, or Firm—Earl L. Larcher; J. Donald Griffin; Harold W. Adams

[57] ABSTRACT

Graphite articles including crucibles and molds used in metallurgical processes involving the melting and the handling of molten metals and alloys that are reactive with carbon when in a molten state and at process temperatures up to about 2000° C. are provided with a multiple-layer coating for inhibiting carbon diffusion from the graphite into the molten metal or alloys. The coating is provided by a first coating increment of a carbide-forming metal on selected surfaces of the graphite, a second coating increment of a carbide forming metal and a refractory metal oxide, and a third coating increment of a refractory metal oxide. The second coating increment provides thermal shock absorbing characteristics to prevent delamination of the coating during temperature cycling. A wash coat of unstabilized zirconia or titanium nitride can be applied onto the third coating increment to facilitate release of melts from the coating.

12 Claims, 1 Drawing Sheet

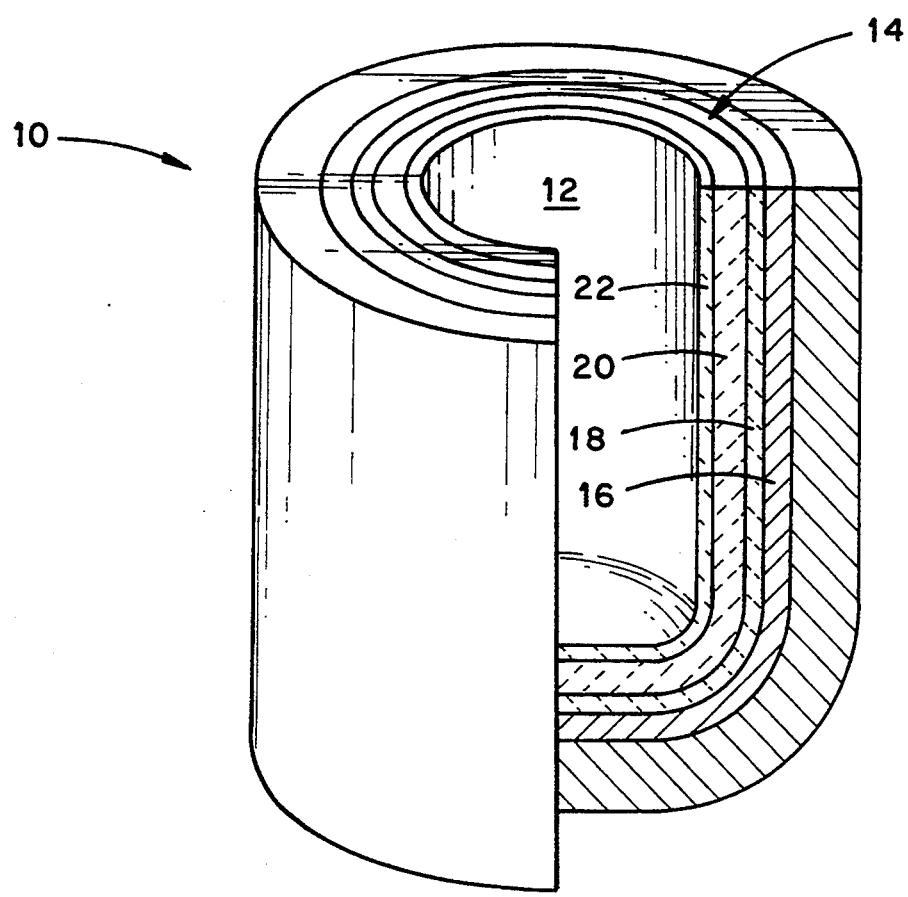

COATED GRAPHITE ARTICLES USEFUL IN METALLURGICAL PROCESSES AND METHOD FOR MAKING SAME

BACKGROUND OF THE INVENTION

The present invention relates generally to coated graphite articles such as crucibles and molds for use in high temperature metallurgical processes involving molten metal, and more particularly to such coated graphite articles wherein the coating inhibits carbon diffusion from the graphite article into the molten metal at melt temperatures up to about 2000° C.

This invention was made with the support of the United States Government under contract No. DE-AC05-84OR21400 awarded by the U.S. Department of Energy. The United States Government has certain rights in this invention.

In metallurgical processes involving the melting of metals and alloys such as by vacuum induction melting or vacuum arc melting using consumable electrodes, the crucibles, as well as other metallurgical or foundry components, used in such processes are necessarily constructed of high-melting materials such as ceramics and graphite or water-cooled metal (copper). The melting of reactive metals such as uranium, zirconium, titanium, beryllium, and the alloys of such metals by induction melting techniques has been successfully achieved by using water-cooled copper crucibles but only in the production of relatively small melts of about 60 lbs (27 kg). On the other hand, using graphite as the construction material for the crucibles, molds and the like for the vacuum induction melting of such reactive metals provides for substantially increasing the size of the melts to about 500 to 800 or more lbs. However, this use of graphite causes undesirable carbide inclusions to be formed in the melt due to carbon from the graphite diffusing into the melt. Thus, while carbon contamination of the melted product is a major drawback to the use of graphite in high temperature metallurgical processes involving molten metals and alloys, graphite is still particularly suitable for the construction of such metallurgical components or articles since it is readily machinable, possesses good electrical conductivity, provides excellent thermal shock resistance, and has high levels of refractoriness and strength at extremely high temperatures. Also, graphite components are less expensive than similarly sized copper or ceramic components.

Efforts to overcome this problem of carbon contamination of molten metals when graphite articles are used in the metallurgical processes has been previously addressed with some success being achieved by coating the surfaces of the graphite crucibles, molds, and other foundry articles contactable by molten reactive metals or alloys with various ceramics and refractory metals. These coatings have substantially reduced the carbon contamination of the melts at metal melting temperatures up to about 1500° C. For example, graphite crucibles coated with either yttria or zirconia and used in the induction melting of uranium inhibited carbon contamination of the uranium by preventing carbon from diffusing through the coating at process temperatures up to about 1350° to 1450° C. However, at the higher process temperatures of 1400° to 1450° C., this coating failed to inhibit carbon diffusion and the molten uranium became contaminated by the carbon. Other coatings for graphite metallurgical articles included the use of two-layered coatings such as provided by a layer of niobium or tungsten under a layer of yttria and/or zirconia. These two-layered coatings successfully inhibited carbon contamination of the melt up to process temperatures of about 1500° C., but at higher process temperatures carbon contamination of the melt was again present. Thus, while previously known graphite coatings have been successful for reducing carbon contamination of molten metals at temperatures up to about 1500° C., these coatings have been found to be barely adequate for preventing carbon contamination of high melting reactive metals such as uranium (1300° C.) and uranium alloys (1385°–1500° C.), beryllium (1280° C.) and beryllium alloys and are totally inadequate for preventing carbon contamination of higher melting metals such as zirconium (1852° C.) or titanium (1730° C.) and alloys thereof.

SUMMARY OF THE INVENTION

Accordingly, a primary aim or objective of the present invention is to provide coated graphite articles for use in high temperature metallurgical processes involving molten metals with the coatings on the graphite articles having the capability of significantly inhibiting, if not entirely preventing, carbon diffusion from the graphite into the molten metal at melt temperatures below about 1500° C. as well as, and more particularly, between about 1500° C. to about 2000° C.

Another object of the present invention is to provide graphite crucibles and other graphite foundry articles such as molds, transition rings, pouring troughs, runners and the like with protective multiple-layer or graded coatings for metallurgical processes involving high melting reactive metals and alloys such as zirconium, titanium, and alloys thereof having melting points greater than about 1500° C. and less than about 2000° C.

A further object of the present invention is to provide a multiple layer or graded coating on graphite articles that is especially useful in metallurgical processes involving molten zirconium or zirconium alloys for significantly inhibiting carbon diffusion from the graphite article through the coating into the molten metal or alloy.

Generally, the above objectives of the present invention are attained by providing graphite articles contactable by molten metal and alloys with protective, non-reactive coatings that are at metallurgical process temperatures up to about 2000° C. Each coated graphite article comprises a graphite substrate and a multiple-layered or graded coating on surface regions of the substrate exposed to the molten metals and alloys for providing a barrier capable of inhibiting diffusion of carbon from the graphite substrate into the molten metal or alloy at process temperatures. The multiple-layered or graded coating comprises a first layer or coating increment supported on selected surface regions of the graphite substrate and substantially formed of a carbide-forming metal, a second layer or coating increment supported on the first layer or coating increment and substantially formed of a carbide-forming metal and a refractory metal oxide, and a third layer or coating increment supported on the second layer or coating increment and formed of a refractory metal oxide.

A still further object of the present invention is to provide a wash coating of a selected refractory metal oxide over the third layer of coating to facilitate the release of the melt, upon cooling, from the coating on the coated graphite article.

The multiple-layer or graded coating of the present invention is compatible with both the graphite and reactive metals such as described above and alloys of such metals at melt temperatures up to about 2000° C. Thus, while coating compositions described below are particularly suitable for contact with molten zirconium and zirconium alloys, it is expected that the coatings provided by these compositions will be compatible with other high melting reactive metals and alloys including those described above.

The layered or graded coatings on the graphite articles are preferably provided by employing plasma spraying techniques, but, if desired, can be provided by using a wash coating technique as described in U.S. Pat. No. 4,002,784 which issued Jan. 11, 1977, to J. G. Banker et al. This patent is incorporated herein by reference.

Other and further objects of the present invention will become obvious upon an understanding of the illustrative embodiments and methods about to be described or will be indicated in the appended claims, and various advantages not referred to herein will occur to one skilled in the art upon employment of the invention in practice.

DESCRIPTION OF THE DRAWING

The Figure is a perspective view, partially cut away, illustrating a graphite crucible provided with a multiple-layer coating and a top wash coat of the present invention as the thickness of the layered coating and wash coat are significantly magnified for illustration and description of the present invention.

A preferred embodiment of the coating of the present invention has been chosen for the purpose of illustration and description. This preferred embodiment illustrated is not intended to be exhaustive nor to limit the invention to the precise form of coating shown since a graded coating, which is difficult to accurately illustrate, also represents a preferred embodiment. Thus, the preferred embodiment is chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

As described above the present invention is generally directed to a coating system for graphite articles utilized in metallurgical processes involving molten reactive metals and alloys thereof for essentially inhibiting, if not entirely preventing, diffusion of carbon from the graphite through the coating into the molten metal and thereby causing carburization and the formation of carbide inclusions in the melt at metal melting temperatures up to about 2000° C. More preferably, the graphite coating system of the present invention is provided on graphite crucibles and molds used in the vacuum induction melting of high melting reactive metals and alloys such as mentioned above at temperatures of about 1500° C. and preferably in a range of about 1500° C. to about 2000° C. Most preferably, the coated graphite crucibles and molds of the present invention are useful for the induction melting of zirconium and zirconium alloys at temperatures greater than about 1500° C.

The coating system of the present invention is provided by either a coating formed of at least three individually and successively applied layers defined by a first layer of a carbide-forming metal, a second layer of a carbide-forming metal and a refractory metal oxide or a ceramic, and a third layer of refractory metal oxide or ceramic or by a graded coating formed of these materials in an essentially continuous and sequential manner. Therefore, except for the specific descriptions of the three-layer coating and the graded coating set forth below, the phrase "multiple-layer coating" as used herein is intended to be descriptive of both the three-layer coating and the graded coating provided by coating increments which correspond to the coating layers. Further, while the description below is principally directed to the coating of a graphite crucible for the induction melting of zirconium, it is to be understood that the coating system as described herein can be used for coating graphite articles including crucibles employed in other metallurgical processes involving the induction melting of other reactive metals and alloys or the alloying of such metals. Such other reactive metals and alloys have melting points up to about 1500° C. and more preferably in the range of about 1500° C. to about 2000° C. Also, the coating of the present invention can be applied to any graphite article used in metallurgical and foundry processes that are exposed to temperatures between about 1000° C. and 2000° C. and contactible by reactive molten metal and alloys for preventing carbon contamination of such metals and alloys.

The coated graphite articles, especially crucibles and molds, as provided by the present invention permit the induction melting and other metallurgical processes such as alloying of selected metals to be achieved in significantly larger quantities than attainable by previously used water-cooled copper crucibles and in a manner substantially less expensive than achievable by using presently available ceramic crucibles or by using consumable electrode techniques.

With reference to the Figure there is generally shown a graphite crucible 10 containing a metal-receiving cavity 12 with the walls of the cavity being provided with the multiple-layer coating 14 of the present invention. The innermost or first layer 16 or a coating increment of the three-layer coating, or four-layer coating when a melt-release top coat is utilized, is placed on the interior wall surfaces of the graphite crucible and is provided by a high-melting carbide-forming metal selected from molybdenum, tungsten, niobium, tantalum, hafnium, titanium, zirconium, and combinations of such metals. These metals are characterized by their high melting points, coefficients of thermal expansion fairly close to that of graphite, self-bonding properties, and the ability to form carbides with the carbon diffusing from the graphite at high temperatures. Preferably, this innermost layer 16 of the coating is formed of molybdenum or tungsten and, most preferably, is formed of molybdenum. The layer 16 of the selected carbide-forming metal is of a thickness in the range of about 0.005 to 0.060 inch, preferably about 0.045 inch, which is adequate to intercept any carbon diffusing from the graphite crucible during induction melting operations at temperatures as high as about 2000° C. and then converting the intercepted carbon to carbides within the metal layer. At metal melting temperatures below and up to about 1500° C., a metal layer 16 near 0.005 inch satisfactory for intercepting and converting to carbide any carbon diffusing from the graphite crucible. However, as process temperatures increase the thickness of the layer 16 is also required to be increased due to increased carbon diffusion. With a preferred layer thickness of 0.045 inch, a sufficient mass of metal is present in layer 16 for carbon interception and carbide formation at process temperatures up to about 2000° C.

The metal layer 16 is preferably applied to the surface of the graphite crystal 10 by plasma spraying powders of the selected metal or combination of selected metals by plasma spraying metal powders onto the graphite surfaces as will be described below. By using plasma spraying techniques to form this coating layer 16 as well as the next two layers, a tenacious bond is provided between the metal layer 16 and the graphite crucible 10 as well as between the subsequently applied coating layers or coating increments that is maintainable through repeated heating and cooling cycles with heating temperatures up to about 2000° C. The metals selected for the layer 16 except for hafnium have melting points greater than 2000° C. and (except for niobium, tantalum, and titanium which respectively have coefficients of thermal expansion of $8.3 \times 10^{-6}/°$ C., $7.1 \times 10^{-6}/°$ C., and $9.4 \times 10^{-6}/°$ C.) have coefficients of thermal expansion, namely, $5.8 \times 10^{-6}/°$ C. for molybdenum, $4.8 \times 10^{-6}/°$ C. for tungsten, $5.9 \times 10^{-6}/°$ C. for zirconium, and $5.9 \times 10^{-6}/°$ C. for hafnium, that are sufficiently close to that of graphite of grades normally used in metallurgical processes, such as CS graphite, which have coefficients of thermal expansion in the range of about 4 to $6 \times 10^{-6}/°$ C. for substantially inhibiting and delamination of the metal layer 16 from occurring when subjected to thermal cycling at process temperatures as high as about 2000° C.

While the plasma sprayed molybdenum, tungsten, hafnium, and tantalum were found to provide an adequate bond with the graphite, the plasma sprayed niobium, due to its relatively high coefficient of thermal expansion, tended to undergo delamination when exposed to temperature cycling encountered in induction melting processes. This delamination problem with niobium was substantially obviated by first plasma spraying a thin undercoat of about 0.003 to 0.006 inch of tungsten or molybdenum onto the surface of the graphite crucible 10 and then covering this thin undercoat with the plasma sprayed niobium to the final thickness desired of the layer 16. The plasma sprayed niobium sufficiently bonds to the tungsten or molybdenum undercoat to prevent delamination of the niobium during induction melting operations.

The second or next innermost layer 18 or increment of the coating 14 is provided by a "cermet" formed from a blend of one of the aforementioned high-melting metals used in layer 16 and a ceramic or refractory metal oxide selected from alumina, yttria, or zirconia partially stabilized with calcia, magnesia, or yttria. The metal used in this combined metal-refractory oxide layer 18 is preferably the same metal as used in the formation of layer 16 due to coefficient of thermal expansion concerns. This second or middle layer 16 of the three-layer coating 14 functions as a thermal shock absorber between the metal layer 16 and the third layer 20 of the coating or coating increment which is formed of a ceramic or refractory metal oxide as will be described below. The use of this thermal shock absorbing layer 18 is critical to the present invention since it provides a thermal shock absorbing transition joint or interface between the required outer ceramic or refractory oxide layer 20 and the carbide-forming metal layer 16.

In other words, this layer 18 prevents delamination of the coating layers as would occur without such a thermal shock absorbing layer during temperature cycles encountered during high temperature induction melting and subsequent cooling stages due to the significant differences in coefficients of thermal expansion of the metal in layer 16 and the ceramic or refractory metal oxide in layer 20.

The second layer 18 is provided by plasma spraying a powder blend of the selected metal and the refractory metal oxide onto the previously formed metal layer 16. Satisfactory levels of thermal shock absorption is achieved by forming the second layer from a 40–60/60–40 weight percent, preferably a 50/50 weight percent, blend of the metal and the refractory metal oxide or ceramic. Alternatively, and preferably, the second layer 18 is in the form of a gradient provided by 100% metal and 0% refractory metal oxide at the interface with the first layer 16 and 0% metal and 100% ceramic or refractory metal oxide at the interface with the third layer 20.

This second layer 18 of coating 14 need only be of a thickness sufficient to provide adequate thermal shock absorbing between the metal layer 16 and the third layer 20 to prevent separation of the coating layers during temperature cycling. Satisfactory levels of thermal shock absorbing can be provided by forming the second layer 18 with a thickness in the range of about 0.005 to 0.025 inch, preferably 0.007 inch. As with the first layer 16, exposure of the coating 14 to increasing temperatures requires a corresponding increase in thickness of the second layer to assure the presence of adequate thermal shock absorption.

The third layer or coating increment 20 is formed of a ceramic or refractory metal oxide which is non-reactive with the molten metal or alloying constituents contacted thereby and which is selected from partially stabilized zirconia, yttria, and alumina. Preferably, the third layer 20 is formed of the same refractory oxide as used in the second layer 18. This coating layer 20 is preferably provided by plasma spraying powders of the selected refractory metal oxide onto the second layer 18 and is of a thickness sufficient to separate the metal in the second layer 18 and the molten metal in the crucible 10. With the second layer 18 formed of a blend of the metal and the refractory metal oxide, the thickness of the third coating layer 20 can be in the range of about 0.005 to 0.030 inch, preferably about 0.015 inch. Again, with higher process temperatures the thickness of the coating must be increased above 0.005 inch to assure the presence of an adequate spacing between the metal in layer 18 and the molten metal at process temperatures. In the event the forming of the second coating layer 18 is provided as a graded layer ranging from 100% metal at the interface with the first coating layer 16 to 0% metal at the interface with the third coating layer 20, the thickness of the third layer 20 can be in the range of about 0.005 to 0.020 inch which is sufficient to provide the desired spacing since the interface regions of the second layer 18 contiguous to the third layer would be essentially, if not entirely, formed of the refractory metal oxide.

The formation of the three-layer coating or the coating increments providing a graded coating can be respectively achieved by plasma spraying each of the layers individually or by forming the "layers" in a continuous manner by changing at a preselected rate the composition of the powder feed to the plasma spray gun so that it varies from 100% metal to 100% refractory metal oxide and thereby providing each increment of the graded coating with a desired thickness. This continuous formation of the graded coating inhibits the formation of layer interfaces so as to further prevent possible delamination problems between the coating "layers" during temperature cycling. The total thickness of the three-layer coating 14 is in the range of about 0.015 to 0.115 inch.

The formation of the layered or graded coating by employing plasma spraying techniques is satisfactorily achieved by using conventional plasma spraying equipment, preferably, in an inert gas environment such as an argon atmosphere so as to inhibit the oxidation of the metal powders. Open-air plasma spraying of the oxide-containing layers 18 and 20 is satisfactory. The metal powders used for forming the layers 16 and 18 by plasma spraying are preferably 99.7% pure and of a size in the range of about $-325/+500$ mesh. The refractory metal oxides used in the layers 18 and 20 are of a mesh size of $-200/+325$ except for the yttria which is preferably $-100/+325$ mesh. Typical plasma spraying parameters which may be used for the applying of the coating layers include the use of a primary gas of argon or helium at a flow rate of about 20 to 25 slm with an arc current of 400 amps and an arc voltage of 35 volts. An argon carrier gas flow rate of about 4 slm provides a spray rate in the range of about 0.1–0.3 g/s with a stand-off distance of 9 cms.

In a test of the carbon barrier properties of the multiple-layer coating of the present invention, a high temperature graphite susceptor furnace rated at 10 kHz and 50 kW power was employed. A crucible provided with a three-layer coating formed of a 0.045 inch molybdenum first layer 16, a 50/50 weight percent molybdenum-calcia stabilized zirconia second layer 18 (0.007 inch), and a 0.015 inch calcia stabilized third layer 20 was loaded with pieces of pure zirconium and the furnace evacuated to $91 \times 10^3$ Pa, backfilled with argon, and heated to 1900°–1950° C. for 30 minutes in an argon atmosphere. The molten metal was then furnace cooled in argon to approximately 40° C. and removed. An examination test of the zirconium melt for graphite inclusions indicated that some carbon was present in the melt but that further investigations indicated that this carbon was provided by the atmosphere in the furnace rather than through the coating 14 since the coating appeared to be intact. A microprobe analysis of the zirconium melt indicated that there was no evidence of carbon infiltration into the portion of the melt next to the coating, and that the carbides in the melt were formed along the region of the melt exposed to the furnace atmosphere. The location of these carbides indicated that the furnace atmosphere was the contributing factor for the carburization of the melt rather than any migration or diffusion of carbon through the coating.

It was found that in melting zirconium in the coated crucibles of the present invention that the cooling of the melt in the crucible caused the melt to tightly adhere to the coating 14 and thereby render the difficult removal of the melt from the crucible. This problem was substantially minimized by placing a wash coat 22 of a refractory metal oxide inert to the melt constituents on the outer surface of the coating layer 20. For zirconium melting operations, a top wash coat 22 of unstabilized zirconia or titanium nitride can be provided over the exposed surface of the coating layer 20 to facilitate release of the cooled zirconium from the coating.

Because of the possible reaction between the stabilizer such as calcia in partially stabilized zirconia, the wash coat 22 is formed of non-stabilized zirconia. The use of the wash coat 22 provides for the easier release of the melt from the crucible molds and other metallurgical articles used in the melting and handling of molten reactive metals and alloys. Without using the wash coat 22, removal of the cast ingot from the mold may be difficult and even with the wash coat the use of a two-piece mold may be preferred for further facilitating the removal of the melt from the mold.

The wash coat 22 can be applied to exposed surfaces of the outer coating 20 by using the wash coating method described in the aforementioned U.S. Pat. No. 4,002,784, for the application of a wash coat of zirconia, hafnia, alumina, yttria or titanium nitride. Generally, as described in this referenced patent, the slurry of the wash coating constituents is formed of particles of a selected refractory metal oxide or titanium nitride suspended in an aqueous sodium carboxymethylcellulose solution in a concentration of about 1.5 to 4% by weight with respect to water. The resulting aqueous slurry can be applied to the surface of the coating layer 20 by painting or spraying. After the slurry is so applied it is dried at ambient temperatures for about two hours. The organic suspension agent decomposes at about 700° C. during the metallurgical or foundry procedure. The thickness of the wash coat 22 is in the range of about 0.002 to 0.010 inch, preferably about 0.005 inch.

While the preferred mechanism for applying the coating layers 16, 18, and 20 to the wall surface of the crucible 10 defining the cavity 12 is the use of plasma spraying techniques as described above, it will appear clear that these coating layers may be satisfactory provided by forming them of wash coatings of the selected metals and refractory metal oxides such as provided by using the method described in the aforementioned patent. In using such wash coating techniques to form the coating layers, any layer thicknesses of greater than about 0.005 inch requires the use of several wash coating applications with drying being provided between each wash coat application. For example, in the formation of the metal coating 16 with a thickness of about 0.015 inch, would require at least three successively applied wash coatings of about 0.005 each.

It will be seen that the present invention provides a coated graphite metallurgical article which can be used for melting reactive metals or alloys at temperatures up to about 2000° C. or the handling of such molten metals or alloys without encountering difficult carbon diffusion and thermal shock problems heretofore encountered in the use of coated graphite crucibles in high temperature melting of reactive metals. The coating on the graphite articles prevents carbon contamination of the melts at process temperatures below 1500° C., the maximum temperatures heretofore achievable with previously known coatings for graphite articles, as well as temperatures between about 1500°–2000° C. so as to represent a significant improvement over such previously known coatings for graphite articles. Additionally, the coatings appear to undergo only minimal reaction such as carbiding with the graphite substrate so as to permit the coated article to be reused several times in high-temperature metallurgical procedures.

What is claimed is:

1. A coated graphite article contactable by molten metal and alloy systems in metallurgical procedures involving molten metal or alloys thereof reactive with carbon in the molten state at temperatures up to about 2000° C., comprising a graphite substrate and a multiple-layer coating on surface regions of the substrate exposed to the molten metal or alloys with said coating providing a barrier for inhibiting diffusion of carbon from the graphite substrate into the molten metal or alloy, said coating comprising a first coating increment supported on said surface regions of the graphite substrate with said first coating increment being of a thickness in the range of about 0.005–0.060 inch and substantially formed of a carbide-forming metal selected from the group consisting of molybdenum, tungsten, niobium, tantalum, hafnium, titanium, zirconium, and combinations thereof, a second coating increment supported on the first coating increment with said second coating increment being of a thickness in the range of about 0.005–0.025 inch and substantially formed of a carbide-forming metal selected from the group consisting of molybdenum, tungsten, niobium, tantalum, hafnium, titanium, zirconium, and combinations thereof and a refractory metal oxide selected from the group consisting of partially stabilized zirconia, yttria, alumina, and combinations thereof, and a third coating increment supported on the second coating increment with said third coating increment being of a thickness in the range of about 0.005–0.030 inch and substantially formed of refractory metal oxide selected from the group consisting of partially stabilized zirconia, yttria, alumina, and combinations thereof.

2. A coated graphite article as claimed in claim 1, wherein the carbide-forming metal in said first coating increment and the carbide-forming metal in said second coating increment are formed of the same carbide forming metal.

3. A coated graphite article as claimed in claim 1, wherein the refractory metal oxide in said second coating increment and the refractory metal oxide in said third coating increment are formed of the same refractory metal oxide.

4. A coated graphite article as claimed in claim 3, wherein the carbide-forming metal and the refractory metal oxide in the second coating increment is a graded mixture thereof consisting essentially of the carbide-forming metal at the interface with the first coating increment and the refractory metal oxide at the interface with the third coating increment.

5. A coated graphite article as claimed in claim 3, wherein the second coating increment is provided by a blend formed of about 40 to 60 weight percent of the carbide-forming metal and the balance essentially provided by the refractory metal oxide.

6. A coated graphite article as claimed in claim 1, wherein said coating further comprises a fourth coating increment supported on exposed surfaces of said third coating increment with said fourth coating increment being of a thickness in the range of about 0.005–0.010 inch and formed of a material selected from the group consisting of unstabilized zirconia or titanium nitride for reducing adhesion of solidified melts of the metal or alloy to the coating is unstabilized zirconia or titanium nitride.

7. A coated graphite article as claimed in claim 1, wherein the molten metal reactive with carbon is zirconium, wherein the carbide-forming metal in the first coating increment is molybdenum or tungsten, wherein the carbide forming metal in the second coating increment is molybdenum or tungsten, wherein the refractory metal oxide in the second coating increment is partially stabilized zirconia, and wherein the refractory metal oxide in the third coating increment is partially stabilized zirconia.

8. A coated graphite article as claimed in claim 7, wherein said coating further comprises a fourth coating increment supported on exposed surfaces of said third coating increment with said fourth coating increment being of a thickness in the range of about 0.002–0.010 inch and formed of a wash coat of unstabilized zirconia for inhibiting contact of the molten zirconium or alloys thereof with said third coating increment for reducing adhesion of solidified melts of the metal or alloy to the coating.

9. A coated graphite article as claimed in claim 1, wherein the multiple-layer coating consists essentially of the first, second and third coating increments each as a distinct layer.

10. A coated graphite article as claimed in claim 9, wherein the multiple-layer coating further consists of a wash coating of unstabilized zirconia or titanium nitride supported on surface regions of the third coating increment with said wash coating being of a thickness in the range of about 0.002–0.010 inch.

11. A coated graphite article as claimed in claim 1, wherein the multiple-layer coating is a graded coating of indistinct layers consisting essentially of the first, second and third coating increments.

12. A coated graphite article as claimed in claim 11, wherein a wash coating of unstabilized zirconia or titanium nitride is supported on exposed surface regions of the third layer with said wash coating being of a thickness in the range of about 0.002–0.010 inch.

* * * * *